US009718390B1

(12) United States Patent
Hadley et al.

(10) Patent No.: US 9,718,390 B1
(45) Date of Patent: Aug. 1, 2017

(54) HELICOPTER TRANSPORT APPARATUS

(71) Applicants: William Wade Hadley, Clarksville, TN (US); Laurie J. Hadley, Clarksville, TN (US); Charles Lee Phy, McEwen, TN (US)

(72) Inventors: William Wade Hadley, Clarksville, TN (US); Laurie J. Hadley, Clarksville, TN (US); Charles Lee Phy, McEwen, TN (US)

(*) Notice: Subject to any disclaimer, the term of this patent is extended or adjusted under 35 U.S.C. 154(b) by 0 days.

(21) Appl. No.: 15/211,219

(22) Filed: Jul. 15, 2016

Related U.S. Application Data

(63) Continuation of application No. 11/545,322, filed on Oct. 10, 2006, now Pat. No. 9,403,559.

(60) Provisional application No. 60/725,886, filed on Oct. 11, 2005.

(51) Int. Cl.
| | |
|---|---|
| *B60P 1/64* | (2006.01) |
| *G05D 3/00* | (2006.01) |
| *B60P 3/11* | (2006.01) |
| *B64C 27/04* | (2006.01) |
| *B64D 3/00* | (2006.01) |
| *B64F 1/22* | (2006.01) |
| *B60P 1/02* | (2006.01) |
| *B66D 1/12* | (2006.01) |

(52) U.S. Cl.
CPC ............... *B60P 3/11* (2013.01); *B60P 1/025* (2013.01); *B64C 27/04* (2013.01); *B64D 3/00* (2013.01); *B64F 1/22* (2013.01); *B66D 1/12* (2013.01)

(58) Field of Classification Search
CPC .. B60P 1/027; B60P 1/64; B60P 3/122; B60P 3/1066; G05D 3/00
See application file for complete search history.

(56) References Cited

U.S. PATENT DOCUMENTS

| | | | | |
|---|---|---|---|---|
| 3,140,003 A | * | 7/1964 | Horner | B60P 3/1058 280/414.1 |
| 4,319,862 A | * | 3/1982 | Cook | B60P 3/1058 280/414.1 |
| 7,093,555 B1 | * | 8/2006 | Olson | B60P 3/1075 114/344 |

* cited by examiner

*Primary Examiner* — Bryan Evans
(74) *Attorney, Agent, or Firm* — Gerald R. Black, Esq.

(57) ABSTRACT

The aircraft transport trailer enables the loading, transporting, and unloading of a helicopter. The transport trailer comprises a wheeled trailer having a power unit, a height adjustable roller platform having a first position for loading or unloading the helicopter and a second position for transporting the helicopter, and a winch for moving the helicopter, the winch being power driven, the winch pulling the helicopter forward and releasing backward, a strap assembly being connected to the winch, and a pair of micro-switches positioned upon the trailer in cooperative engagement with the winch. Each micro-switch is positioned upon the trailer proximate to a cushioned bumper and to a towing position for the helicopter. The pair of micro-switches cut the power to the winch as the helicopter skids or wheels touch the micro-switch thereby properly positioning the helicopter upon the platform of trailer for when the trailer is raised to the second position.

20 Claims, 20 Drawing Sheets

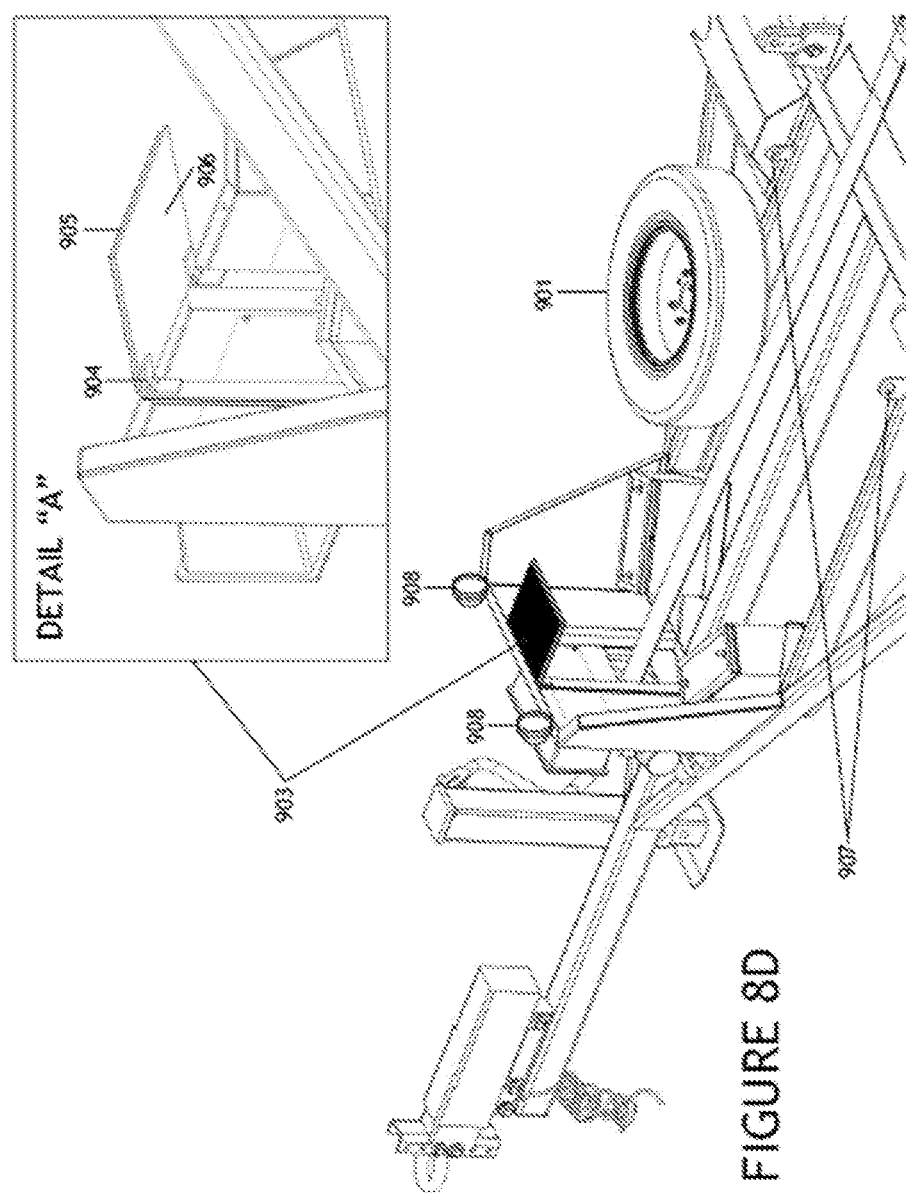

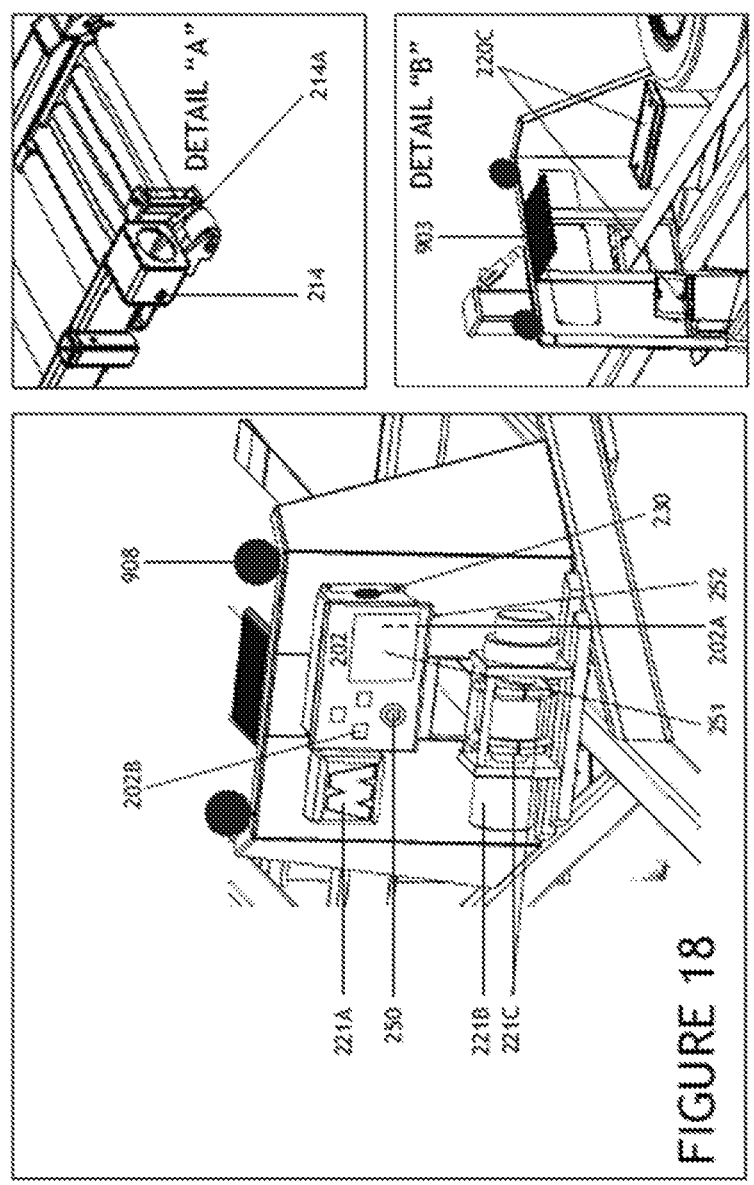

HELICOPTER TRANSPORT APPARATUS

CROSS REFERENCES TO RELATED APPLICATIONS

This Application is related to and claims priority to U.S. Provisional Application for Patent No. 60/725,886, filed Oct. 11, 2005, "Helicopter Transport Apparatus", and this Patent Application is a Continuation-In-Part and claims priority to U.S. patent application Ser. No. 11/545,322, entitled "Helicopter Transport Apparatus", by William Wade Hadley et al., filed Oct. 10, 2006, all of which are incorporated by reference herein.

BACKGROUND OF THE INVENTION

1. Field of the Invention

This invention relates to a transport apparatus enabling loading, transport, and unloading an aircraft such as, but not restricted to, a rotary wing aircraft, commonly known as a helicopter.

2. Background Information

Helicopter transport trailers for moving helicopters relatively short distances at relatively low speeds, i.e. walking speeds, on an airfield are known in the trade. As the retail price of helicopters has increased over the years, better helicopter transport trailers are needed. Also, existing helicopter transport trailers are not suited for highway transport. The current method of transporting a multimillion dollar military or commercial helicopter is to use a flatbed truck. The helicopter is loaded and unloaded at beginning and ending destination by a crane. A second truck and flatbed trailer are required on both ends as well as specialized slings, rigging and personnel to get the aircraft on and off of the trailer. An alternate procedure for recovering a helicopter off-road is to sling-load and move with a cargo helicopter, which is an even more expensive and complicated procedure.

To recover a helicopter from the field currently requires a crane and specialized sling and rigging. The operation using a sling requires several people to guide the helicopter onto a flatbed trailer to avoid damage and to release the sling. A second truck and flatbed trailer are required to deliver the crane to the aircraft site for recovery and are also required at the destination to offload the aircraft from the flatbed. Alternate traditional means require sling-loading and movement by a separate aircraft heavy enough to lift the helicopter, which is a very expensive and complicated procedure.

U.S. Pat. No. 6,273,435 (Stringer) discloses a trailer for use in transporting a load from one area to another area has a frame and a bed operatively mounted to the frame which is capable of being moved from a first or lowered position to a second or elevated position in a substantially vertical manner or non-tilting manner. At least one lifting mechanism is operatively connected to the bed, which applies the greatest force for lifting the bed from the lowered position to the elevated position at the beginning of the lift, rather than at an end or midpoint of the lift. At least one over-center latching mechanism secures the bed to the frame when the bed is in the elevated position.

U.S. Pat. No. 5,700,026 (Zalewski, et al.) discloses a vehicle body lowering system for installation in a motor vehicle having a wheeled carriage, a cargo/passenger compartment body, a door in the passenger compartment body for cargo loading and unloading or passenger embarking and debarking, and a spring suspension for the buoyant support of the body above the carriage between a lower position and an upper position. The components of the vehicle body lowering system include a hydraulic cylinder mounted within the body, a power source, a manually actuated control for energizing and de-energizing the power source, and an interconnection extending through the body between the cylinder and the carriage. The interconnection is characterized by an operative condition at which the body is in the lower position under the control of the power source, and an inoperative condition at which the body is freely subject to the buoyant support of the spring suspension.

U.S. Pat. No. 4,374,592 (Geary, et al.) discloses a vehicle transporter is disclosed, for use in filming scenes in which characters are shown as occupying a moving vehicle, and in which the characters, and adjacent parts of the vehicle, appear in the foreground, and which transporter can also be used for straightforward transportation of such a vehicle by road. The vehicle transporter comprises a low flat platform so contrived that the vehicle in question can readily be driven or wheeled onto it from behind, the transporter having at its front end a relatively raised structure, carrying castor wheels, and having a draw bar bearing a towing attachment.

U.S. Pat. No. 4,363,590 (Crate) discloses a boat is supported on a wheeled trailer frame by idler rollers and by powered rollers, of a self-adjusting type, located adjacent the rear end of the trailer frame from which the boat is loaded or unloaded. The powered rollers are driven by drive motors through self-locking gears to effect loading or unloading. The boat is held in a transport position on the trailer frame by the powered rollers through the self-locking gearing when the drive motors are de-energized.

U.S. Pat. No. 3,993,324 (Carrick) discloses a trailer for carrying a centerboard type sailboat behind a towing vehicle. The trailer includes longitudinally flexible bunks that receive and conform intimately to the hull configuration on opposite sides of the longitudinal boat center line. A walking beam arrangement is located between the bunks and carrying frame to enable free flexing of the bunks while transferring weight of the boat to the framework. The longitudinal resiliency of the bunks enables loading and unloading of the sailboat in relatively shallow water and further facilitates even distribution of the sailboat weight over the entire bunk surface engaged therewith.

As will be seen in the subsequent description, the aircraft transport apparatus of the present invention overcomes the shortcomings of prior art.

SUMMARY OF THE INVENTION

The helicopter transport apparatus of the present invention saves time, money and equipment while enhancing safety and reducing risks, whether for simple administrative or maintenance moves across the airfield, or in off-site or off-road recoveries where terrain and mission permit ground recovery.

Ground recovery with the helicopter transport apparatus of the present invention saves time and money by decreasing equipment and personnel requirements the need for cranes, lowboy trailers, and flatbed transport trucks is eliminated. Recovering an aircraft is accomplished in minutes versus hours, days, or often weeks to round up all of the traditional specialized secondary equipment and personnel required on both ends to accomplish the move.

The helicopter transport apparatus of the present invention saves flight hours by eliminating the need for aerial recovery of downed aircraft where the situation permits ground recovery. In today's military where flight training hours are budget limited this can be especially advantageous as flight hours are saved for pilot training instead of maintenance movements. Litigation, investigative, and administrative costs from noise complaint processing from citizens are also reduced.

The helicopter transport apparatus of the present invention reduces manpower requirements. Movement is typically accomplished by a team of two within ten minutes. One person can prepare a helicopter for movement, load and tow the helicopter where safety requirements allow. The hydraulic trailer bed and the loading winch can be operated remotely from a stand-off position where the operator monitors the entire length of the aircraft throughout the loading process.

The helicopter transport apparatus of the present invention enhances safety for both personnel and airframe as the aircraft is gently loaded from ground level, thereby eliminating the need to rig and lift aircraft by crane or helicopter. Conventional aircraft recovery operations require specialized rigging, equipment and personnel in addition to either a second truck, trailer and crane or a large lifting helicopter to sling load the aircraft. All conventional sling loading procedures greatly increase possibilities of airframe damage.

The aircraft transport trailer enables the loading, transporting, and unloading of a helicopter.

The helicopter transport apparatus of the present invention comprises (a) a trailer having a plurality of wheels, (b) a power unit mounted on the trailer, (c) a height adjustable roller platform having a first position for loading or unloading the helicopter and a second position for transporting the helicopter; and (d) a winch for moving the helicopter, the winch being power driven, the winch mounted upon the trailer, the winch for pulling the helicopter forward and releasing backward.

The helicopter transport assembly further includes a strap assembly. One end of the strap assembly is in cooperative engagement with the winch, and the other end of the strap assembly engageable with the helicopter.

As used herein, a "strap" is a strip of pliant material which includes at least one fastener, the at least one fastener being for binding or securing one or more objects in place.

In addition, the helicopter transport assembly further includes a pair of micro-switches positioned upon the trailer in cooperative engagement with the winch. The pair of micro-switches are positioned upon the trailer proximate to a towing position for the helicopter. The pair of micro-switches cuts the power to the winch as the helicopter skid or wheel touch either of the micro-switches thereby positioning the helicopter upon the trailer in the second position for transporting. Preferably, the pair of micro-switches are positioned relative to a pair of cushioned bumpers. This acts as an automatic winch shutoff when the micro-switch is engaged. The helicopter will be automatically stopped in the optimal transport position by said factory adjustable micro-switches. The bumper "cushion" will be of appropriate material such that is it softer than steel but still hard enough to protect. Various bumper materials include natural and manmade materials, and the materials of choice being UHMW and polyurethanes of varying softness and strength.

An additional micro-switch is included which prevents the trailer from being lowered while the lock latches are closed. The locks are an additional safety feature during transport.

The transport apparatus of the present invention is a transport apparatus such as is usable for, but not restricted to, loading, transporting, and unloading a helicopter or other aircraft; said vehicle comprising a multi-wheel trailer comprising a platform, a torsion bar suspension assembly, a hydraulic power unit, hydraulic rams, a winch, and a means of adjusting the height or the trailer over the range of elevations required for loading, unloading, and transporting said vehicle.

The invention may have a winch that is hydraulically or electrically powered. The brakes may be electric, hydraulic, or pneumatic. The suspension may be torsion bar, spring, or pneumatic.

Aircraft come in varying sizes and weights. The helicopter transport apparatus of the present invention needs to be adjusted and varying components resized given the varying weights, dimensions, and center of gravity of the aircraft to be handled. The center of gravity of an aircraft varies in two principle areas for ground transport purposes: (1) the center of gravity varies greatly with fuel level, and (2) the center of gravity varies greatly depending on if helicopter blades are spread forward and aft as are Huey helicopter blades in FIG. 7 (see below), or are all folded backwards as with OH-58 helicopter blades when ground transported. The aircraft dimensional and weight data will be provided by the customer and result in varying trailer dimensional data and component sizes as are required to safely load the customer's aircraft. Therefore, features which enable factory adjustability greatly enhance the product line and make the helicopter transport apparatus of the present invention more versatile.

The helicopter transport apparatus of the present invention has self-contained electrical and hydraulic systems eliminating the need for tow vehicle power hook-ups to the helicopter transport apparatus if batteries are well charged.

BRIEF DESCRIPTION OF THE DRAWINGS

FIG. 8D, along with Detail "A", depict the addition of a solar pulse charging assembly feature for use with the helicopter transport apparatus any embodiment.

FIG. 18, along with Detail "A" and Detail "B", depict yet another variation of the helicopter transport apparatus of FIG. 8A, including a central control panel, an electric winch assembly, and strap alignment guides which enable remote control of the loading and unloading.

DETAILED DESCRIPTION OF THE PREFERRED EMBODIMENTS

Figure 1:
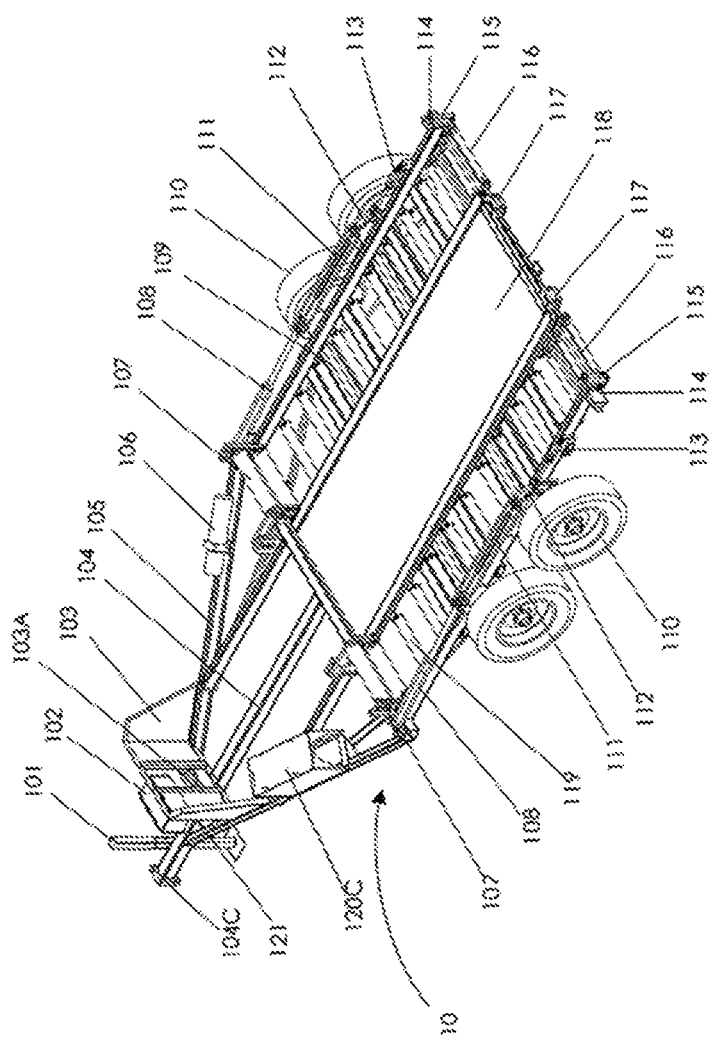
FIG. 1 depicts a first preferred embodiment of the helicopter transport apparatus of the present invention.
Figure 5:
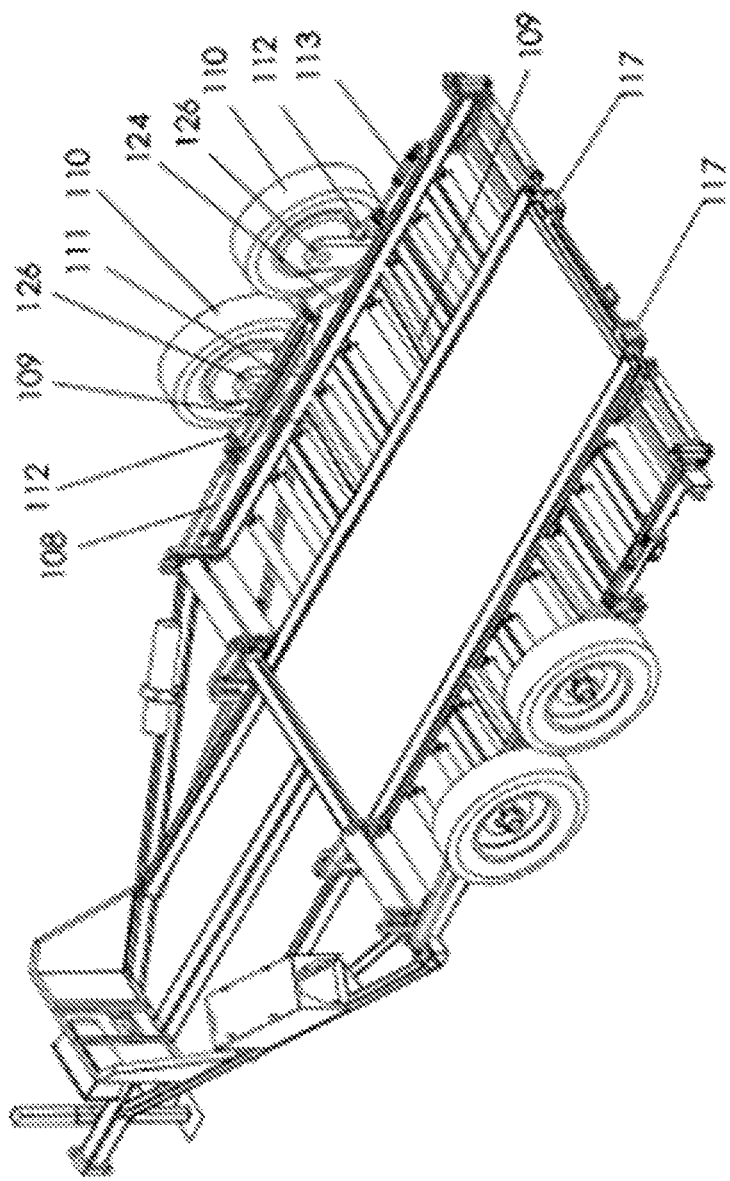
FIG. 5 depicts the helicopter transport apparatus of FIG. 1 in the lowered elevation for loading, which is typically the same as for unloading, a helicopter.

Referring now to FIGS. 1 and 5, the first preferred embodiment of the present invention, a helicopter transport apparatus 10 comprises a trailer jack 101, a hydraulic control 102, a front guard 103, a winch clearance 103A, a tongue 104, a frame 105, a hydraulic pump 106, bumpers 107, lift cylinders 108, wheels 110, pivot links 111, latches 112, lock cylinders 113, brake lights 114, vertical rollers 115, rocker roller assemblies 116, ground rollers 117, deck plate 118, helicopter skid rollers 119, battery containment assembly 120C, a winch 121, and pintle height adjustment plate 104C.

A description of the first preferred embodiment is as follows:

The winch 121 serves to load a helicopter onto the helicopter skid rollers 119.

The vertical rollers 115 serve for location of the skids of a helicopter to be loaded onto the skid rollers 119.

The rocker roller assemblies 116 each pivot about a central axis, perpendicular to a helicopter skid in the loading of a helicopter.

Figure 2:
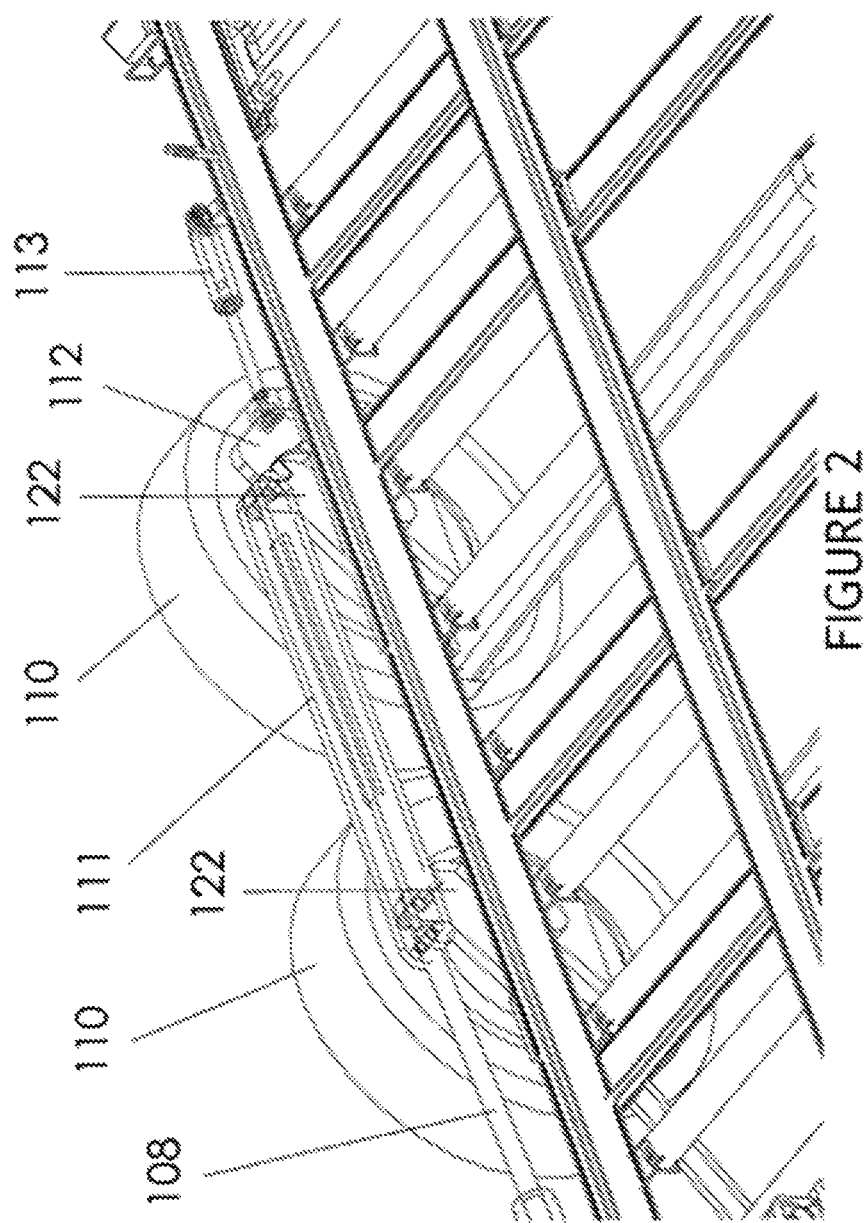
FIG. 2 depicts an inboard view of wheels locked in place for the proper elevation for transporting a helicopter with the helicopter transport apparatus of FIG. 1.
Figure 3:
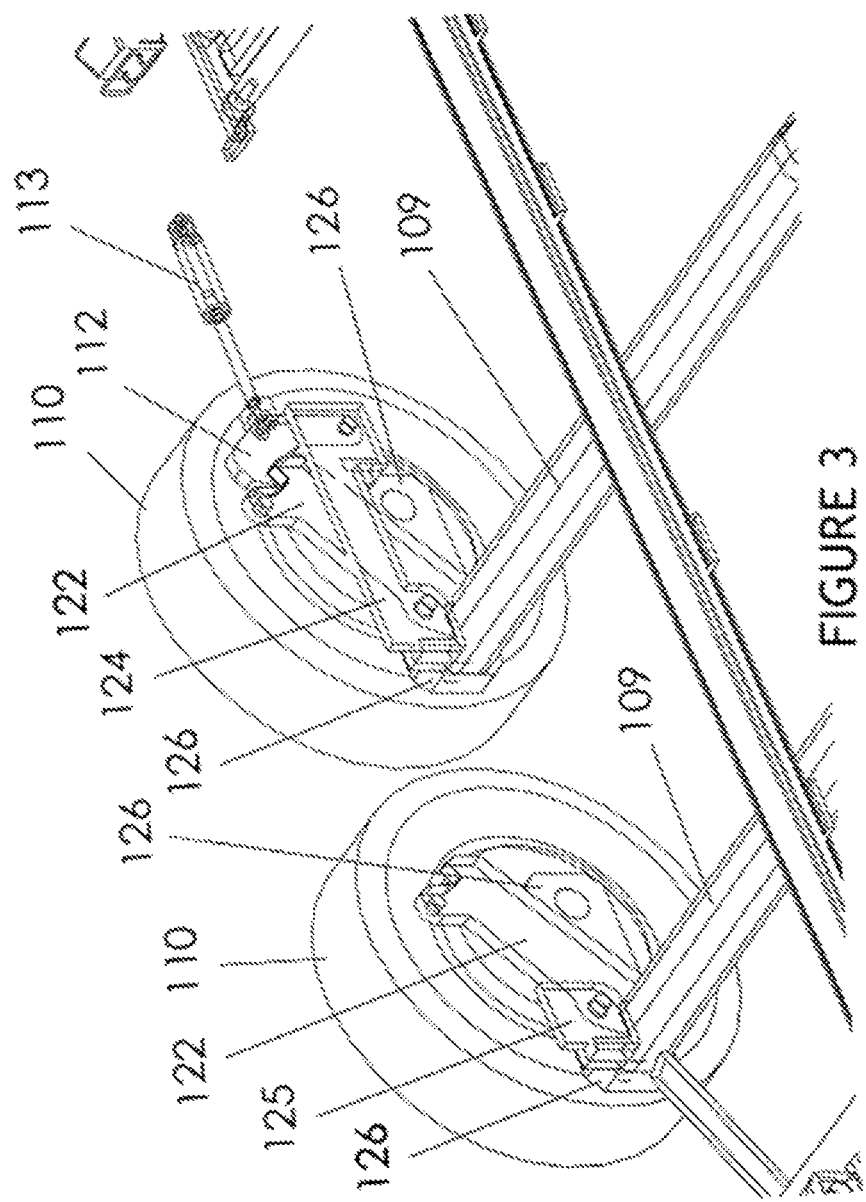
FIG. 3 depicts greater detail of the inboard view of the wheels shown in FIG. 2.
Figure 4:
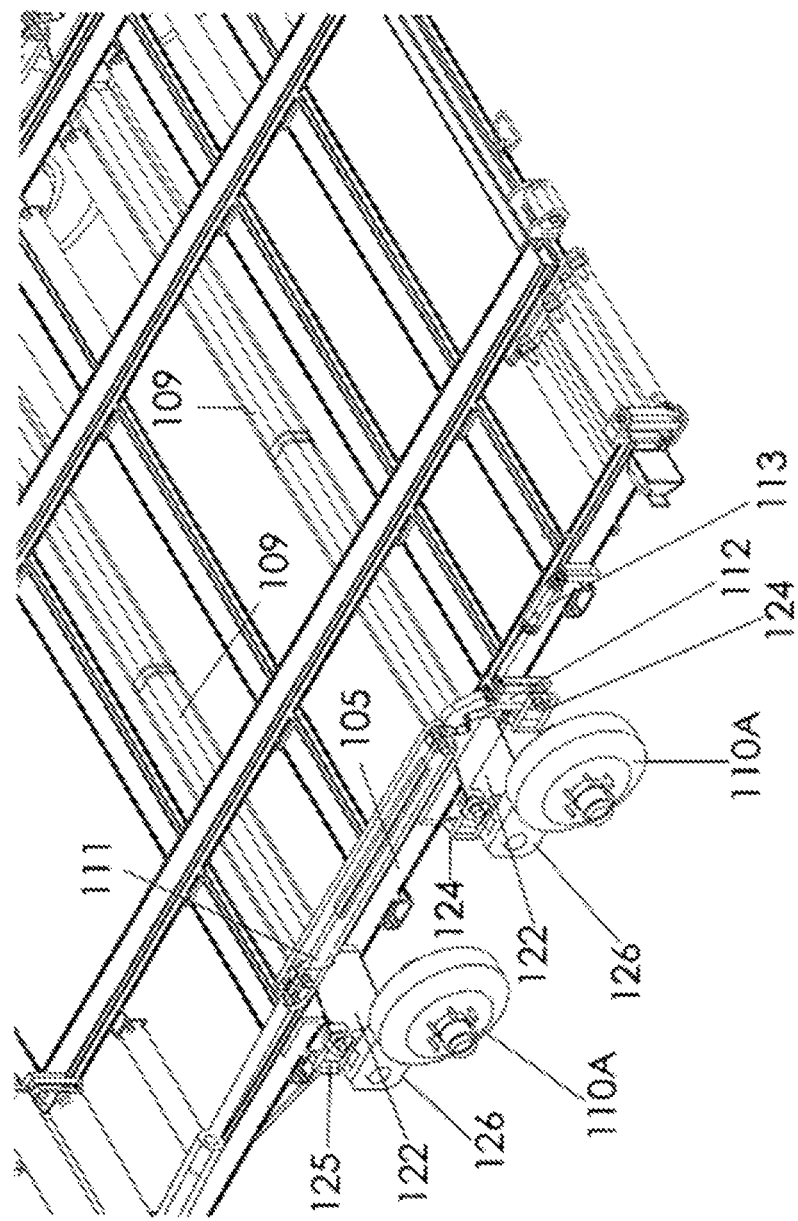
FIG. 4 depicts an outboard view of wheels locked in place at the proper elevation for transport of the helicopter transport apparatus of FIG. 1.
Figure 6:
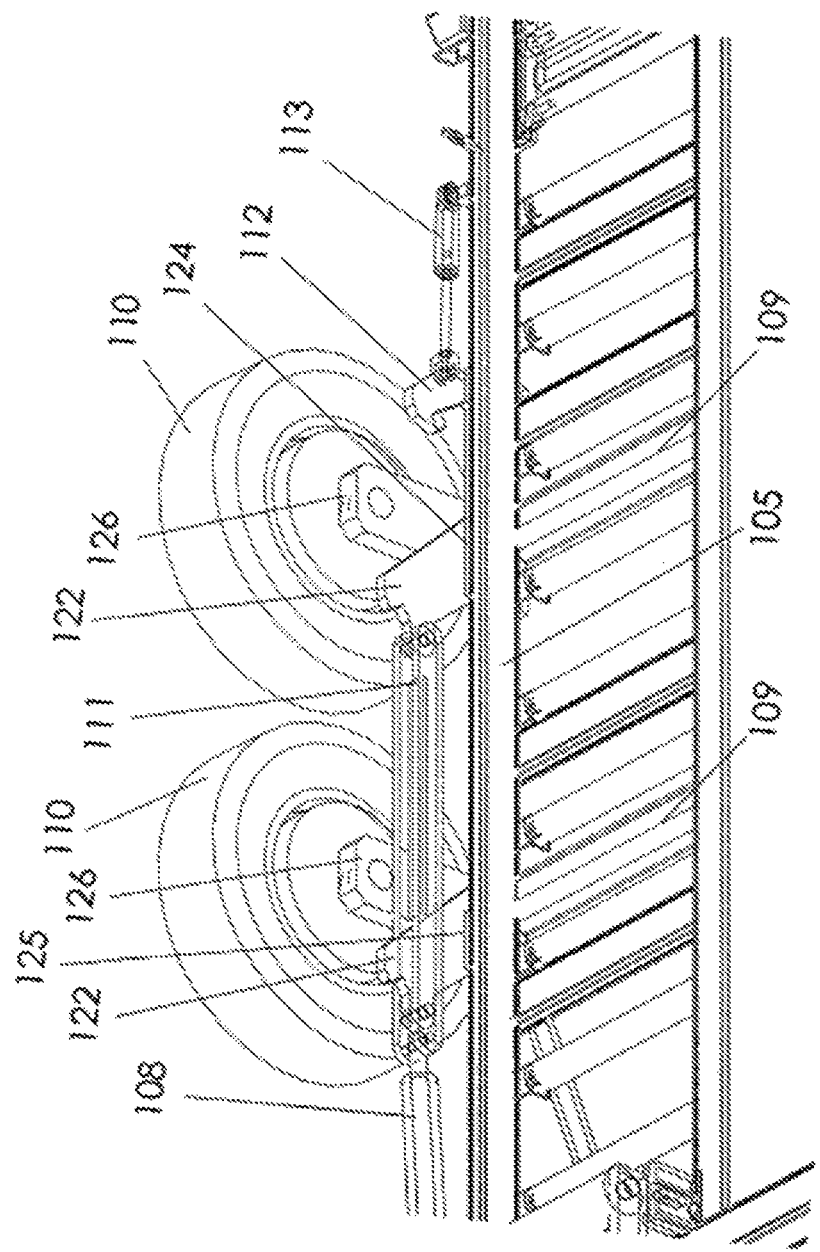
FIG. 6 depicts wheels positioned for loading or unloading a helicopter with the helicopter transport apparatus of FIG. 1.

Refer to FIG. 4 or an outside view and to FIGS. 2 and 3, for a view inside a pair of wheels 110 locked into position required for transporting a helicopter, and to FIGS. 5 and 6 for the wheels 110 unlocked for loading a helicopter, where one pivot link 111 connects to each of two axle pivots 122 as well as one of the lift cylinders 108 and also one of the lock cylinders 113 and also to two axle pivots 122.

Also, FIG. 4 depicts a pair of the wheels/brakes/axle assemblies 110A with the wheels 110 (shown in FIGS. 1, 2, and 3) removed.

The axles 109 connect to links 126 which are affixed to the wheels 110. Each axle 109 pivots a pair of axle pivots 122. Each pair of axle pivots 122 are pivotably connected to either a rear axle pivot 124 or a front axle pivot 125, each pair of which said pivots, 124 or 125, is connected to the wheels 110 and to a given axle 109. This arrangement causes the axle pivots 122 on each side of the trailer 10 to rotate at the same speed such that the platform 118 of the trailer is maintained in a level orientation as the trailer is raised and lowered.

The axle pivots 122, when unlocked by action of the lock cylinders 113, can be rotated in either direction, clockwise or counterclockwise by action of the lift cylinders 108 on the pivot links 111 which rotate the links 126 which raises or lowers the wheels 110, which in turn control the elevation of the helicopter transport apparatus 10 for loading, unloading, or transport.

The axles 109 are Henschen DURA-FLEX™ torsion axles known to the trade. Applicants could not find any application reference to use of Henschen DURA-FLEX™ torsion axles on transport trailers at the web site, www.henschenaxles.com, and believes this application is unique.

Figure 7:
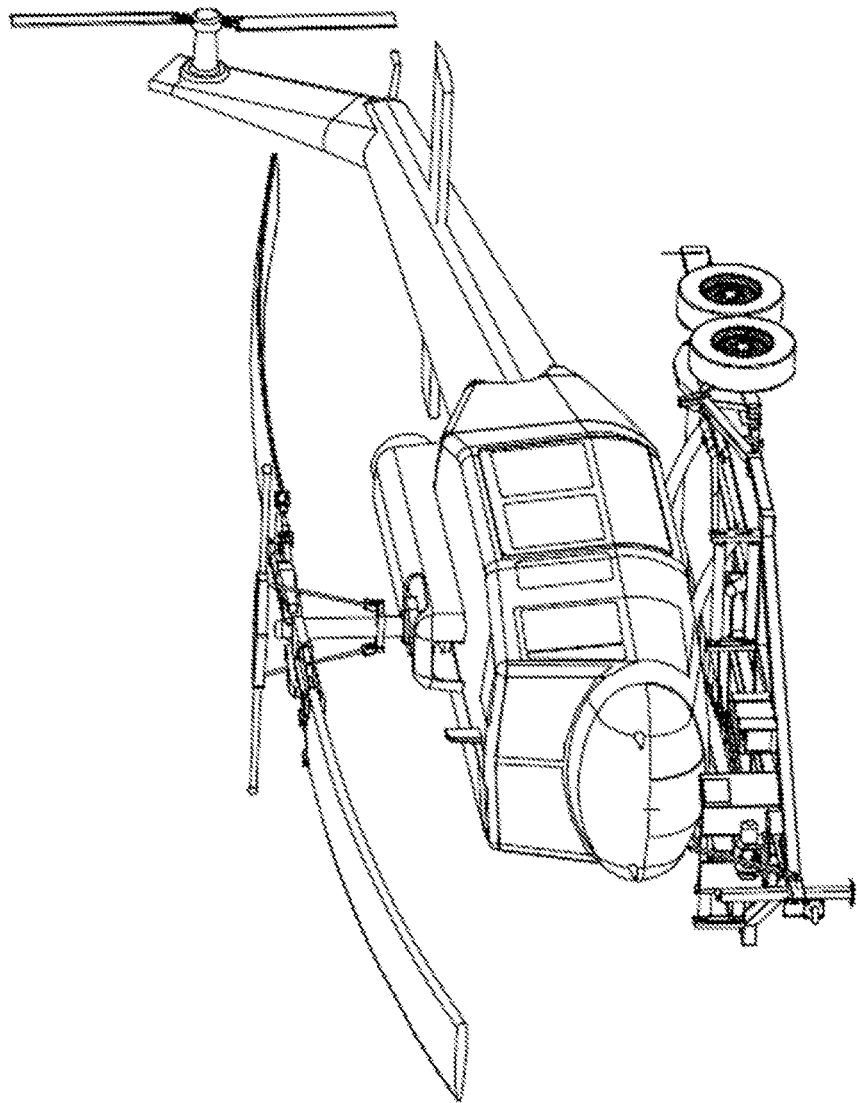
FIG. 7 depicts an application of the helicopter transport apparatus.

FIG. 7 illustrates an application of an embodiment of the present invention with a helicopter mounted thereupon.

In operation the trailer 10 is backed up such that the vertical rollers 115 are on either side of the helicopter skids and the trailer 10 is generally aligned with the helicopter. The cable or strap (not shown) is released from the winch 121 and attached to the helicopter. Latch cylinder 113 is powered to release the latches 112. Cylinder 108 is then powered to move the pivot link 111 from the transport position shown in FIG. 2 to the loading position shown in FIG. 6. The pivot link 111 is then free to move. The trailer is preferably, but not necessarily, then backed up further and rocker rollers 116 are engaged as aircraft gently self-loads until rocker roller assemblies 116 pivot down and is resting level with main rollers 119. Power from battery box 120C can then be applied to power a hydraulic pump 106 to power winch 121 to wind the cable or strap and pull the helicopter. The plate 118 and tops of horizontal rollers 119 form a horizontal platform surface. As the winch 121 tightens the cable or strap the helicopter will move toward the trailer. The operator loading the helicopter can use a remote control 202A to control winch 121, this enables the operator to stand at a safe distance and walk around the helicopter as the aircraft is loaded onto the trailer. Vertical rollers 115 on the trailer corners help to guide the helicopter skids onto the trailer 10. The winch 121 pulls the helicopter forward toward the front of the trailer 10 until the skids contact the skid stop bumpers 107. In the preferred embodiment of the helicopter transport apparatus depicted in FIG. 15, the skid stop bumpers 107A are vertically adjustable for varying aircraft skid heights (also in FIGS. 8A and 10). The skid stop bumpers are adjustable front to rear in preferred embodiment of the skid stop bumper assembly 207 (see FIGS. 11, 16, and 17).

Figure 8A:
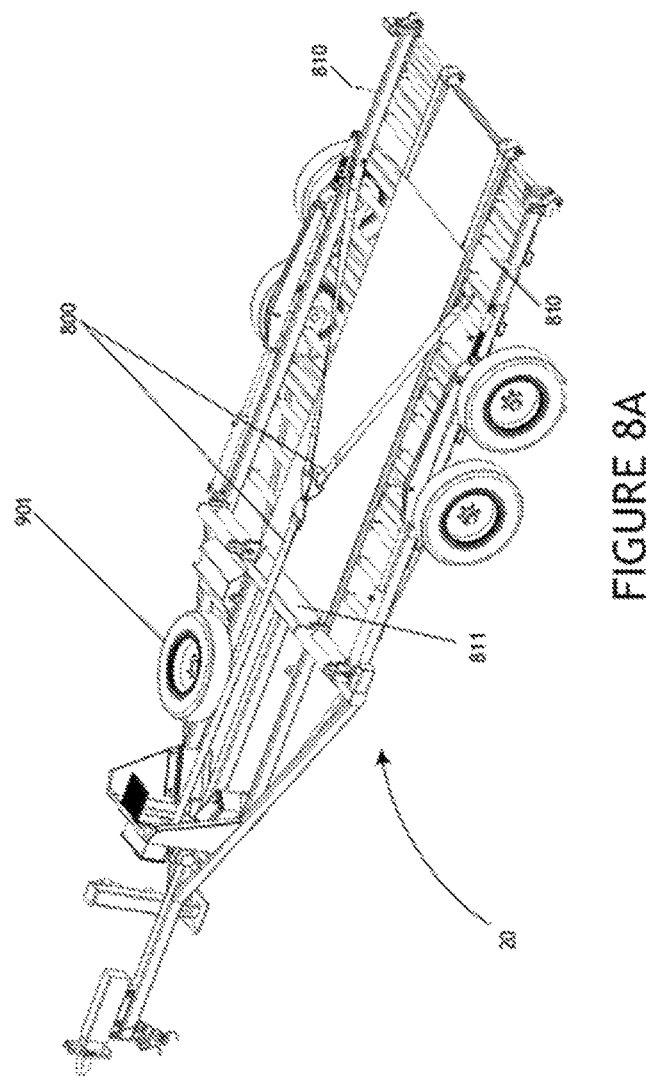
FIG. 8A depicts a second preferred embodiment of the helicopter transport apparatus of the present invention having a unique strap and winch configuration.
Figure 8B:
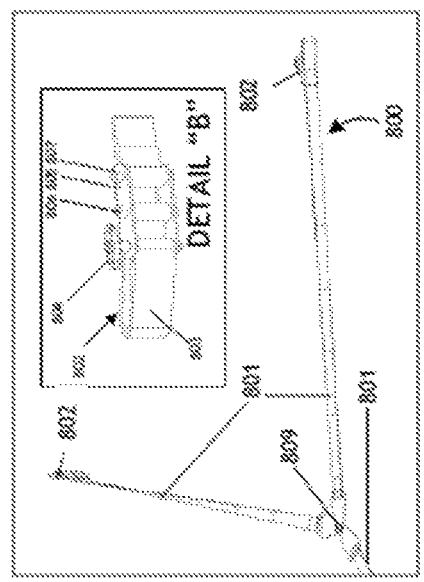
FIGS. 8B and 8C, along with Detail "A" and Detail "B" respectively, depict two alternative loading iterations for strap assemblies on helicopter transport apparatus of any embodiment.
Figure 8C:
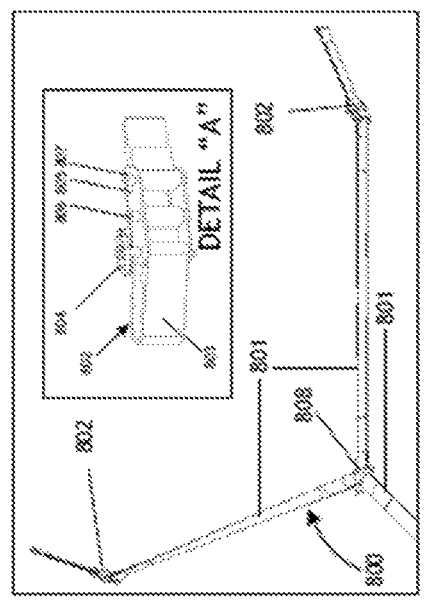

Refer now to FIGS. 8A, 8B and 8C for description of strap and its use. The helicopter transport apparatus 10 or 20 is backed up such that the vertical rollers are on either side of the helicopter skids and the trailer 10 or 20 is generally aligned with the helicopter. The entire strap assembly 800 is depicted in FIG. 8A with a detailed breakdown of the strap subassemblies in 8B and 8C. The strap 800 is released from the winch 121 and is attached to the helicopter at the bottom of the rear skid struts. The strap 801 is attached to left and right skids at either the front or rear skid struts depending on the dimensional data, the center of gravity, and/or reinforced attachment points of the aircraft. The straps are actually made up of a 5 strap assembly that is depicted in FIGS. 8B and 8C. The entire strap assembly comprises 1 center, 1 left and 1 right strap sections 801 which ends with a quick release assembly which contains 2 quick release loops straps 803 that wrap around the helicopter skid and are fastened by means of the quick release buckle 805 and its fasteners 804,806, and 806. Again, as helicopter skids vary, so does size of various strap components. Referring to FIGS. 1 and 8A, power from battery box 120C can then be applied as in Figure to power a hydraulic pump 106 and to power winch 121 to wind the cable and drag the helicopter the remaining distance onto bed of horizontal rollers 119. The plate 118 and tops of horizontal rollers 119 form a horizontal platform surface. As the winch 121 tightens the strap 800 the helicopter will move toward front of the trailer. The operator loading the helicopter uses a remote control 102 or 202A (can also be onboard control switch wired to central control panel if preferred) to control winch 121, this enables the operator to stand at a safe distance and view the helicopter is loaded. Vertical rollers 115 on the trailer corners help to guide the helicopter skids onto the trailer 10 or 20. The winch 121 pulls the helicopter forward toward the front of the trailer 10 or 20 until the skids contacts the bumpers 107. A first design configuration is depicted in FIG. 8B (with DETAIL "A") for the rear loading strap, and an alternative design configuration is depicted in FIG. 8C (with DETAIL "B") for the rear loading strap.

The helicopter is then secured to the trailer 10 or 20 and the cylinder 108 reverses direction moving the pivot link 111 back to pivot the axle pivots 122 to raise the trailer deck platform 118 and helicopter from the load position back to the transport position. When the platform 118 is fully raised the link 111 can be locked against motion by latch 112 which is controlled by cylinder 113. Control operations for the winch 121, the lift cylinders 108 and lock cylinders 113 and all be controlled form the central control panel 202. A remote control 102 or 202A usually controls the winch 121 for improved visibility while loading.

As shown the winch 121, lock cylinders 113 and lift cylinders 108 are all powered by hydraulic fluid from pump 106 which in turn is powered by battery 120. It will be understood that the cylinders and/or winch could be electrically powered directly from the battery 120C.

Figure 10:
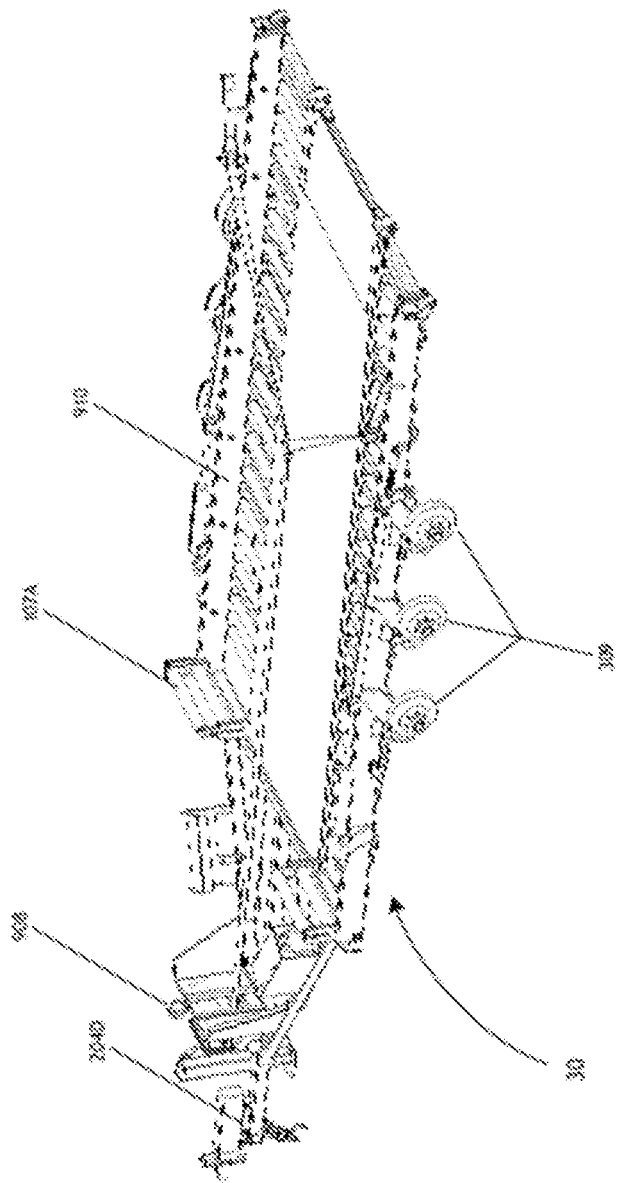
FIG. 10 depicts yet another preferred embodiment of the helicopter transport apparatus of the present invention. This figure illustrates a triple-axle embodiment of the invention for a larger skidded helicopter. This embodiment also includes a loading strap configuration, the forward end of which is cooperatively engaged with the winch assembly, the backward portions of which are cooperatively engaged with the helicopter being towed.

Referring now to FIG. 10, another preferred embodiment helicopter transport apparatus of the present invention 30 is depicted. The helicopter transport apparatus of the present invention 30 is a triple-axle embodiment of the invention for a larger skidded helicopter, and handles three different models of helicopters on one larger platform. The weight of largest helicopter to be handled caused a third axle to be needed. Hence there are two sets of skid stop bumpers 107A which are set at the appropriate positions for the center of gravity of each aircraft to locate properly on the trailer for good tracking over the road. This also required height adjustment beyond standard height adjustable capabilities for moving with a light medium tactical vehicle military prime mover. A pintle height extension 204D has been designed for that accommodation.

Figure 11:
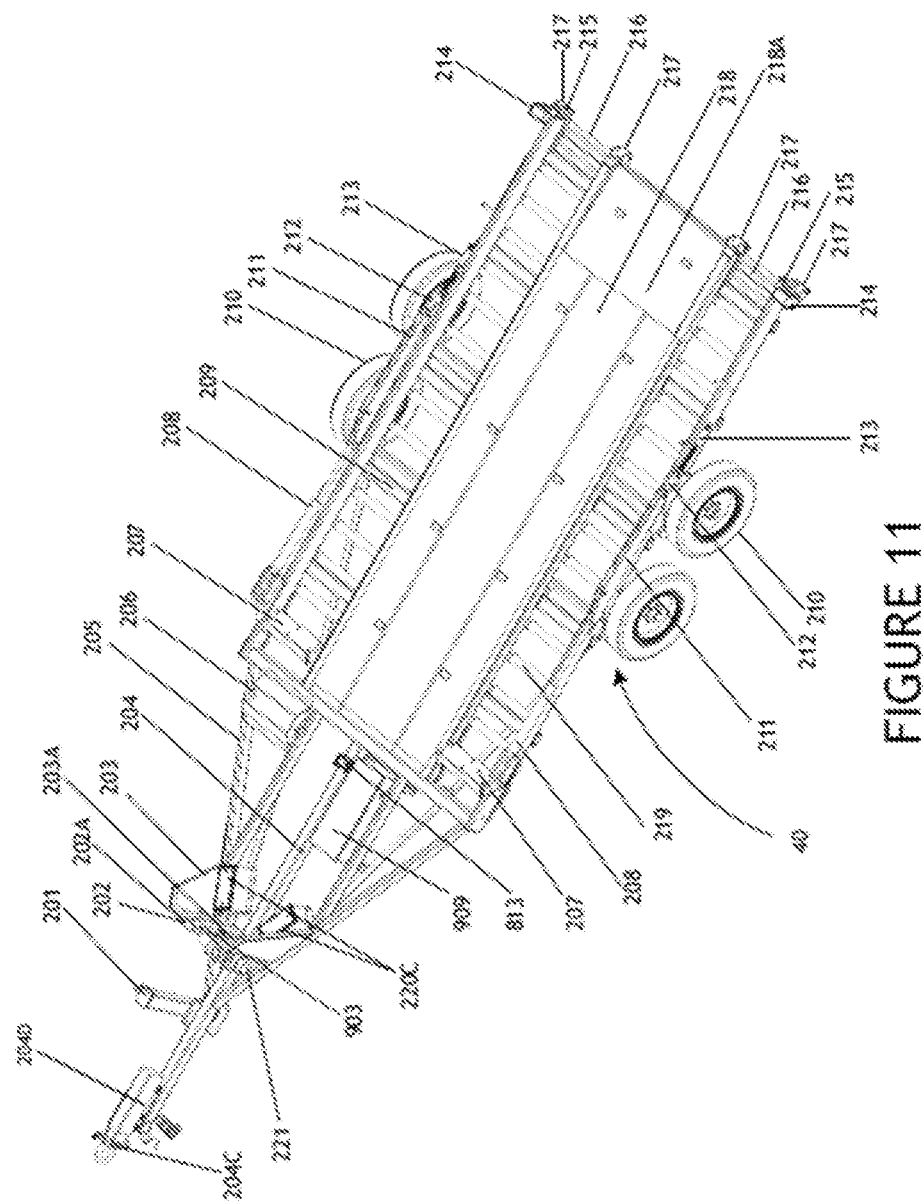
FIG. 11 depicts another preferred embodiment of the helicopter transport apparatus of the present invention, this embodiment being done for the LUH helicopter.

Similarly, referring now to FIG. 11, another preferred embodiment of the helicopter transport apparatus of the present invention 40 is depicted, and comprises similar components of different sizes; a trailer jack 201, a hydraulic control 202, a front guard 203, a winch clearance 203A, a tongue 204, a hydraulic surge brake assembly with adjustable pintle bracket 204C, a frame 205, a hydraulic pump 206, adjustable skid stop bumpers 207, lift cylinders 208, axles 209, wheels 210, pivot links 211, latches 212, lock cylinders 213, led brake lights 214, vertical rollers 215, rocker roller assemblies 216, ground rollers, inner and outer 217, deck plate 218, wire strike relief ramp 218A, and helicopter skid rollers 219, battery assembly 220C, winch 221, strap tensioner 813, and tool/accessory box 909. FIG. 8D illustrates the spare tire 901, solar pulse charger 903, tie-downs 907, and work lights 908. FIG. 8A illustrates the strap holders 810. FIG. 10 illustrates the skid protection channels 910.

Figure 15:
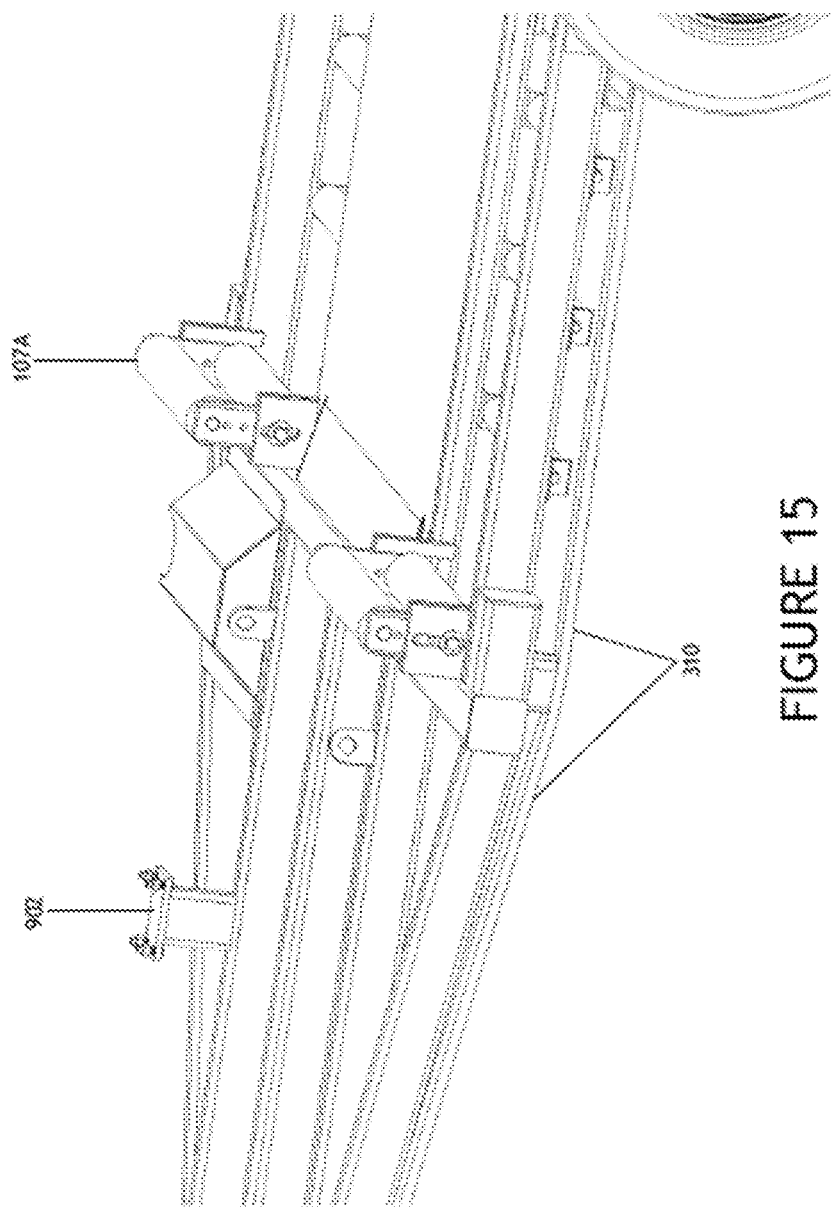
FIG. 15 depicts a second preferred embodiment of height adjustable skid stop bumpers for use with the helicopter transport apparatus of FIGS. 8A and 10.

The winch assembly 221 serves to load a helicopter onto the helicopter skid rollers 219. The winch will vary in size according to the weight and dimensions of the aircraft to be loaded, with a heavier aircraft requiring a larger winch, or in some cases the aircraft may be lighter, but longer dimensionally, thereby requiring a larger winch drum to allow enough strap or cable length to load the aircraft. This preferred embodiment of the helicopter transport apparatus of the present invention 40 includes (FIG. 11) an electric winch assembly 221, made up of the winch itself, 221B, winch controller box 221A, and a strap alignment guide 221C (FIG. 18). The strap alignment guide is unique. This set of guides serves to keep the strap centered and orderly, while also centering the aircraft on the roller platform. The electrical system also includes a central control panel 202, which may have its winch remote control 202A (FIG. 18) inside its housing or which may have the control wired to the central control panel 202, along with other control switches 202B. An interrupting kill switch 250 is wired into the electrical circuit as a safety measure so that anytime an operator views a problem he can hit the large red kill switch and interrupt current to the winch. An instruction plate 251 makes trailer user friendly with instructions clearly written into plate. An additional safety feature is the override switch 252 which re-enables the winch once power has been cutoff. A NATO slave receptacle 230 has been added for recharging of batteries using the standard for tactical communications. Commercial applications allow for recharging at 12V commercial standards. Work lights 908 are present to enable low light operations. This preferred embodiment of the helicopter transport apparatus of the present invention 40 includes LED lights 214A with steel casing 214, with bracing 310 (FIG. 15) and spare tire mount 902 (FIG. 15).

The addition of solar pulse charger 903 maintains batteries when the trailer is parked provides a second method of charging batteries. The solar pulse charger assembly comprises a solar pulse charger 905, a mounting plate 906, and hinges 904. The solar panel may be hinged down when not in use such as in an application where trailer remains constantly connected to trailer's prime mover and electrical system of prime mover is charging batteries. The solar panel may be hinged up when trailer is parked and there is a need to keep a good charge on the batteries for intermittent use of invention. Thus the invention batteries can be charged by either electrical 12V connector, 24V NATO Connector leading to prime mover, by solar pulse charger, or of course by direct battery terminal charge connection if preferred.

The vertical rollers 215 serve for location of the skids of a helicopter to be loaded onto the skid main rollers 219.

The rocker roller assemblies 216 each pivot about a central axis, perpendicular to a helicopter skid in the loading of a helicopter. This gently moves the aircraft from the ground level to the skid rollers 219 which are all in the same plane. To prevent point loading as rocker rollers are introduced to aircraft skids, the back section of the rocker roller assembly employs varying roller sizes or strengths as necessary for varying aircraft models. The helicopter transport apparatus 40 is improved such that two points of each aircraft skid impact the rear section of the rocker roller at once, spreading the load on impact. The rocker rollers are preferred over earlier ramps as they are handling skids. When wheels are on aircraft ramps are employed. Rocker rollers swivel independently enabling varying terrain levels for loading on unimproved surfaces. Trailers are routinely used for off-road recovery of helicopters.

Figure 12:
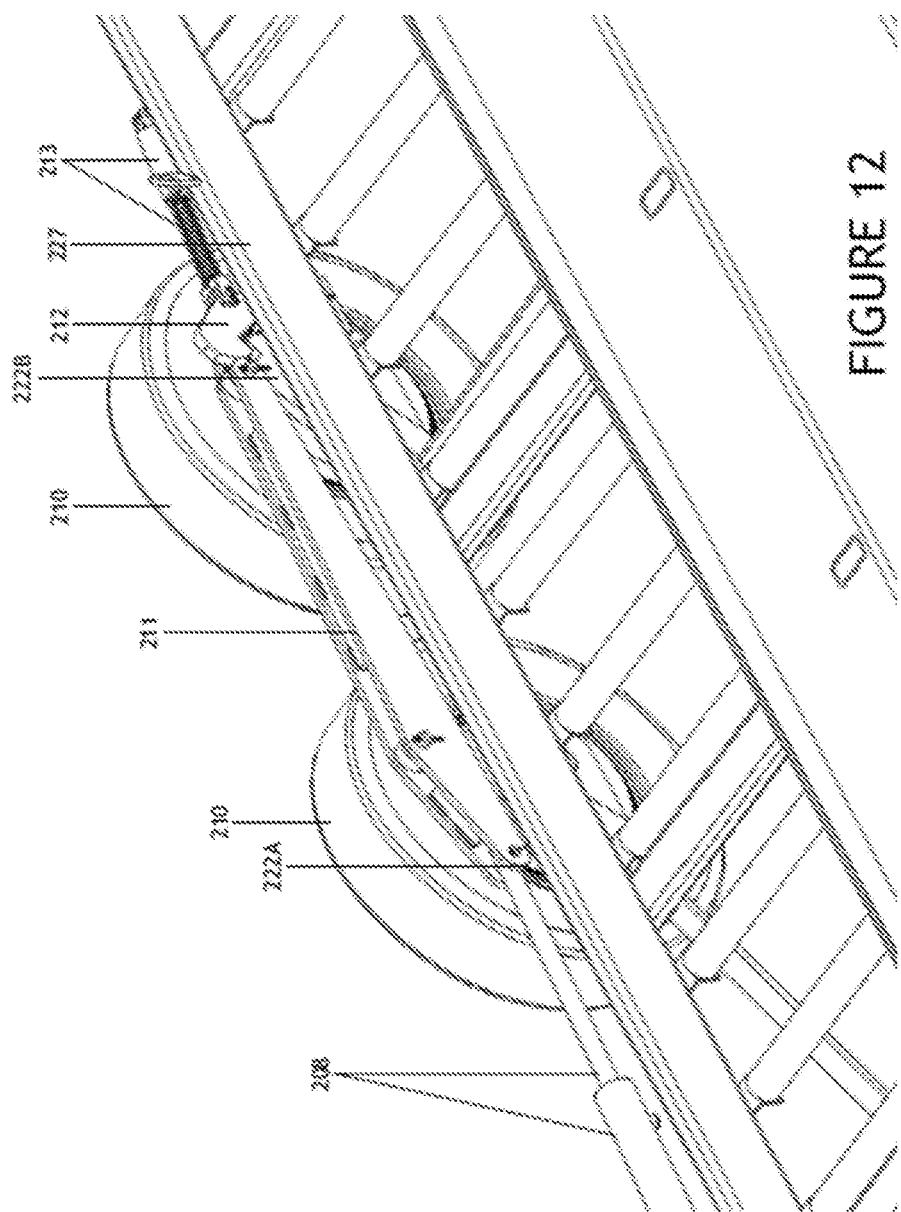
FIG. 12 depicts an inboard view of wheels locked in place for the proper elevation for transporting a helicopter with the helicopter transport apparatus of the preferred embodiment depicted in FIG. 11.
Figure 13:
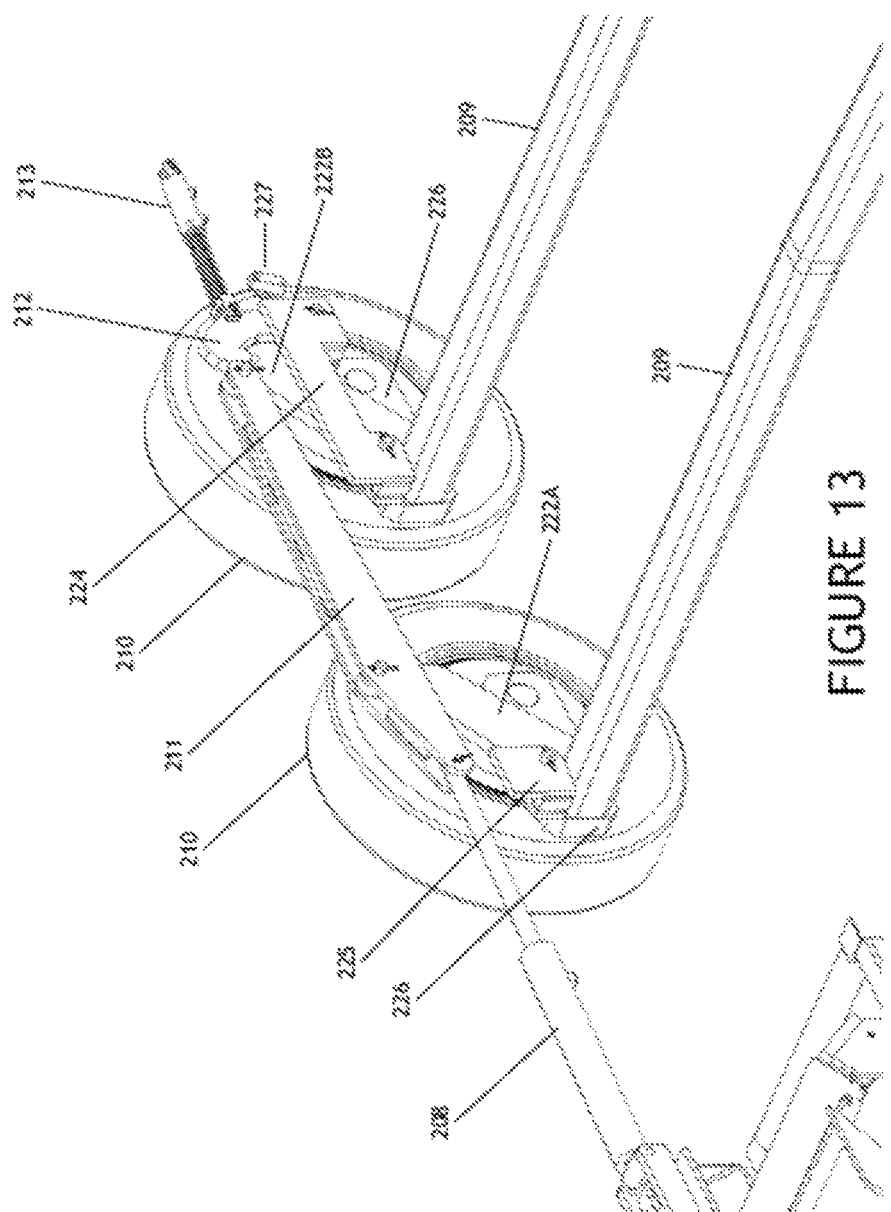
FIG. 13 depicts greater detail of the inboard view of the wheels shown in FIG. 12.
Figure 14:
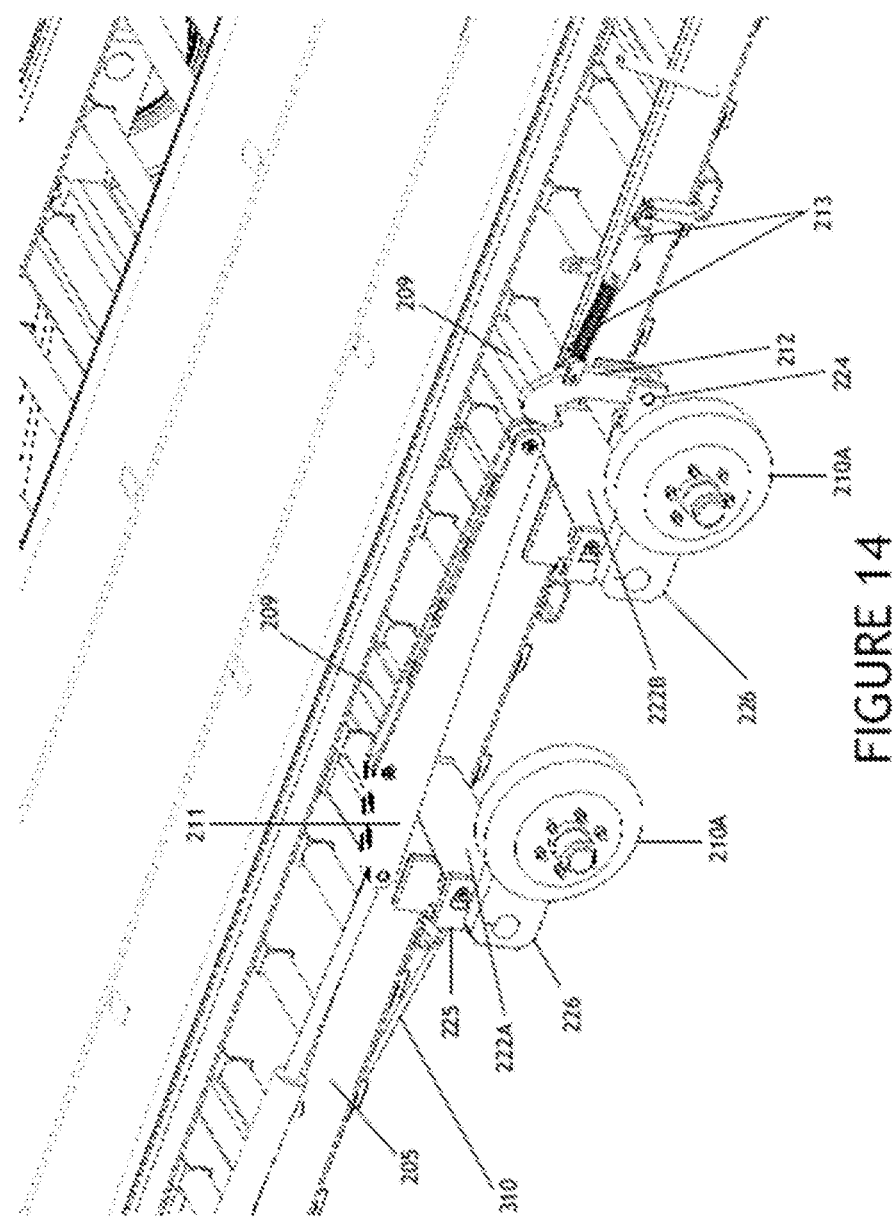
FIG. 14 depicts an outboard view of the wheels of the helicopter transport apparatus of FIG. 11 locked in place for the proper elevation of the apparatus for transporting a helicopter.
Figure 16:
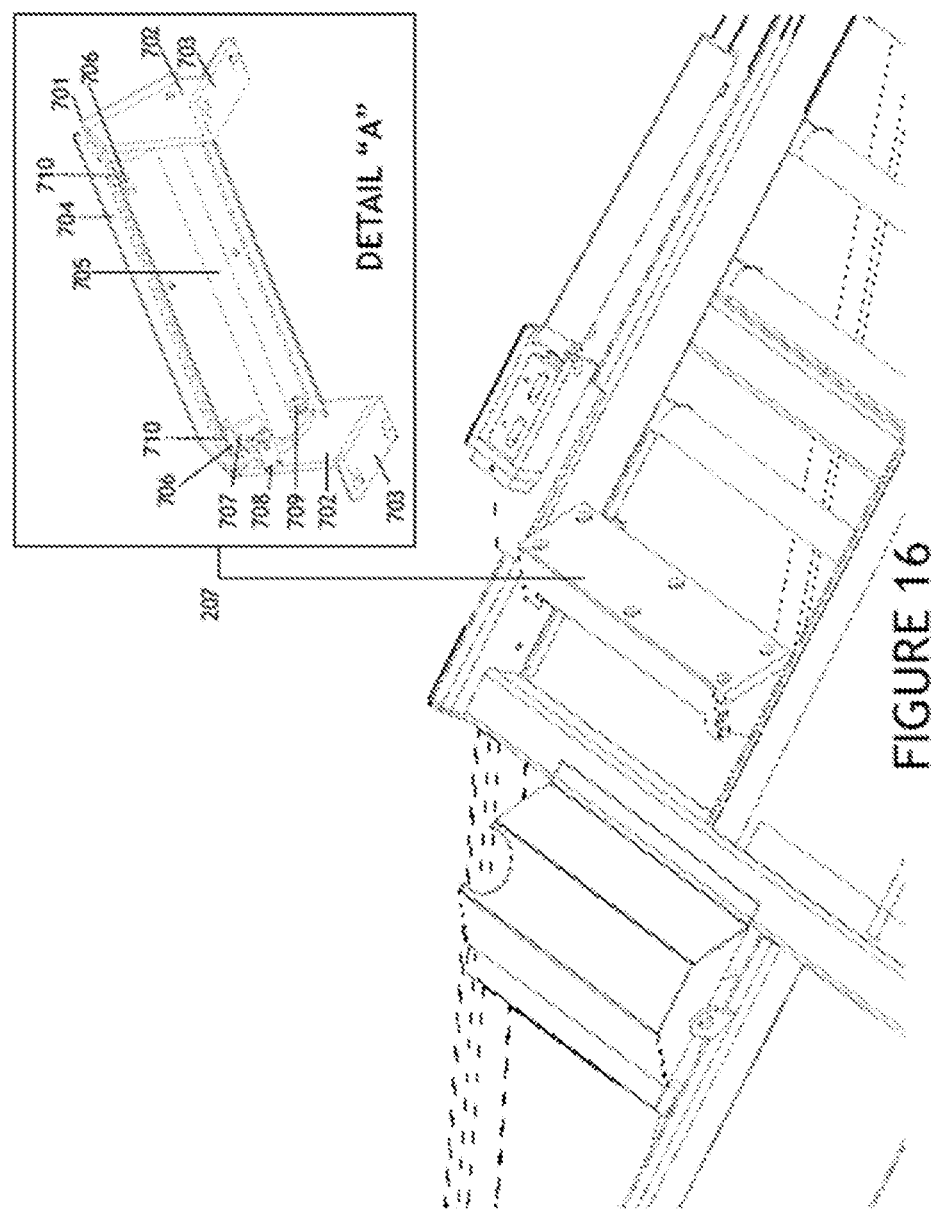
FIG. 16, along with Detail "A", depict a third preferred embodiment of adjustable skid stop bumpers for use with the helicopter transport apparatus of FIG. 11.
Figure 17:
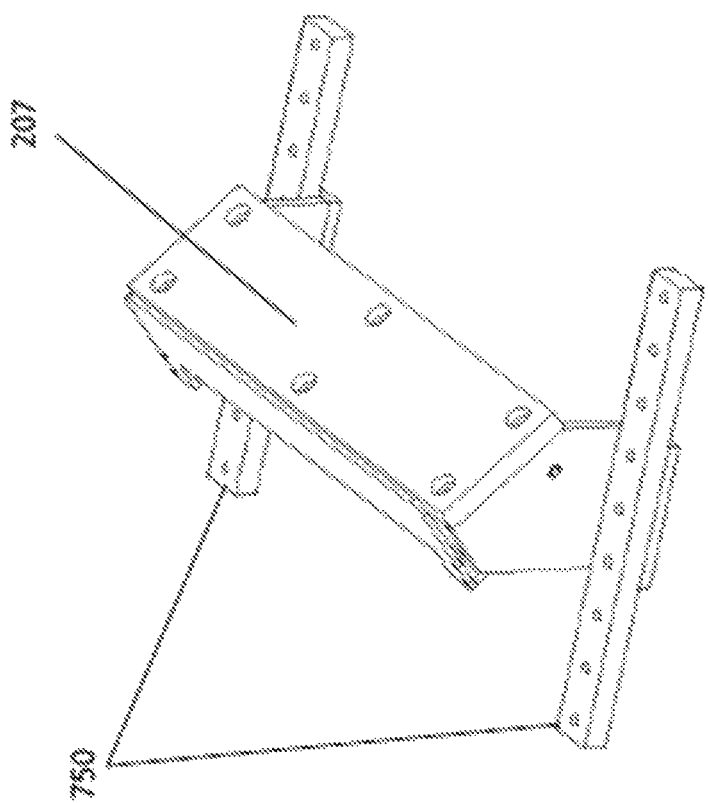
FIG. 17 depicts adjustability of the skid stop bumper of FIG. 16 for varying the center of gravity of the aircraft forward and backward.

Skid stop assembly 207 (FIGS. 11, 16, and 17) is a variation of the skid bumpers, 107 and 107A and offers several distinct advantages over the previous design. In some newer aircraft the traditional design of a skid tip is changed to incorporate the wire strike into the skid itself. This results in a very tall tip which flattens out and is commonly referred to as "elf shoe" skid tips. They do not fit into our standard skid tip bumpers or their height adjustability range. Therefore, this preferred embodiment of the bumper assembly 207 accommodates this new skid style. Skid stop assembly 207 also has the additional benefits of being useful and adjustable for varying aircraft models. The skid stop bumpers 207 are activated when the skid hits the switch activator plate 704, which is adjustable as required. Micro-switch 707 (FIG. 16) breaks current to the winch when strike plate is hit, thereby automatically stopping the aircraft load sequence and preventing operator potentially overloading the aircraft. The skid then rests upon the cushioned bumper pad 701 during transport. A spring return 710 returns assembly to normal setup once unloaded. Other parts called out in FIG. 16 are the side plates 702, foot plates 703, micro-switch mount 708, Shoulder bolt 706, pivot bar 705, and bumper cushion pad 701. Shoulder bolts 709 are fasteners. Refer to FIG. 17 to see that 207 assembly is adjustable forward and aft via an adjustable mounting plate 750. This enables easy factory setup for varying aircraft models or in the case of an odd aircraft accessory such as a huge searchlight in law enforcement operations, then the center of gravity is easily adjusted and interference from searchlight or other protruding accessory is avoided. FIG. 14 depicts an outside view and to FIGS. 12 and 13 for a view inside a pair of wheels 210 locked into position required for transporting a helicopter. Operation is same as in FIGS. 5 and 6 for the wheels 110 or 210 unlocked for loading a helicopter, where the pivot link 111 has been redesigned to a triangular shaped pivot link 211 which connects to each of two axle pivots 222A and 222B as well as one of the lift cylinders 208. This modification results in both wheels staying on the ground when the trailer is in the down position. In first preferred embodiment the front wheel raised off of the ground when the trailer was lowered and the rear wheel only remained on the ground. Lock cylinder assemblies 213 include a mechanical spring to ensure lock remains closed in a safe position in the event you lose hydraulic pressure. A safety switch 227 (FIG. 13) has been added to the electrical circuit to prevent lowering the trailer while trailer is locked, which is the transport position. Otherwise attempting to lower trailer while locked could overstrain pump or break a lock. In explanation, 210A depicts wheel hub and brake assembly only with tire and wheel not shown for clarity purposes. Brakes need not be limited to electric, but might be electric, hydraulic, or pneumatic. Hydraulic surge brakes 204C are depicted in FIG. 11, second preferred embodiment. Suspension need not be limited and can also be pneumatic.

Here, action is the same as in the first preferred embodiment of the helicopter transport apparatus, FIGS. 1 thru 6. Referring also back to FIG. 11, as well as FIGS. 12, 13 and 14, the axles 209 connect to links 226 which link to the wheels 210. Each axle 209 pivots a pair of axle pivots 222A and 222B. Each pair of axle pivots 222A and 222B are connected to either of a rear axle pivot 224 or a front axle pivot 225. The axle links 226 are connected to the wheels 210 connected to a given axle 209. This arrangement causes the axle pivots 222A and 222B on each side of the trailer 20 to rotate simultaneously such that the platform 218 of the trailer is maintained in a level orientation as the trailer is raised and lowered.

The axle pivots 222A and 222B, when unlocked by action of the lock cylinders 213, can be rotated in either direction, clockwise or counterclockwise by action of the lift cylinders 208 on the pivot links 211 which rotate the links 226 which raises or lowers the wheels 210, which in turn control the elevation of the helicopter transport apparatus 40 for loading, unloading, or transport.

The axles 209 are torsion axles known to the trade. Pneumatic axles can also be employed. Applicants are unaware of any application reference using torsion axles on helicopter transport trailers at the web site, www.henschenaxles.com, and so believes this application is unique. Henschen was later bought by GKN Axles, and then AL-KO Axis, and still no application reference can be found.

Figure 9:
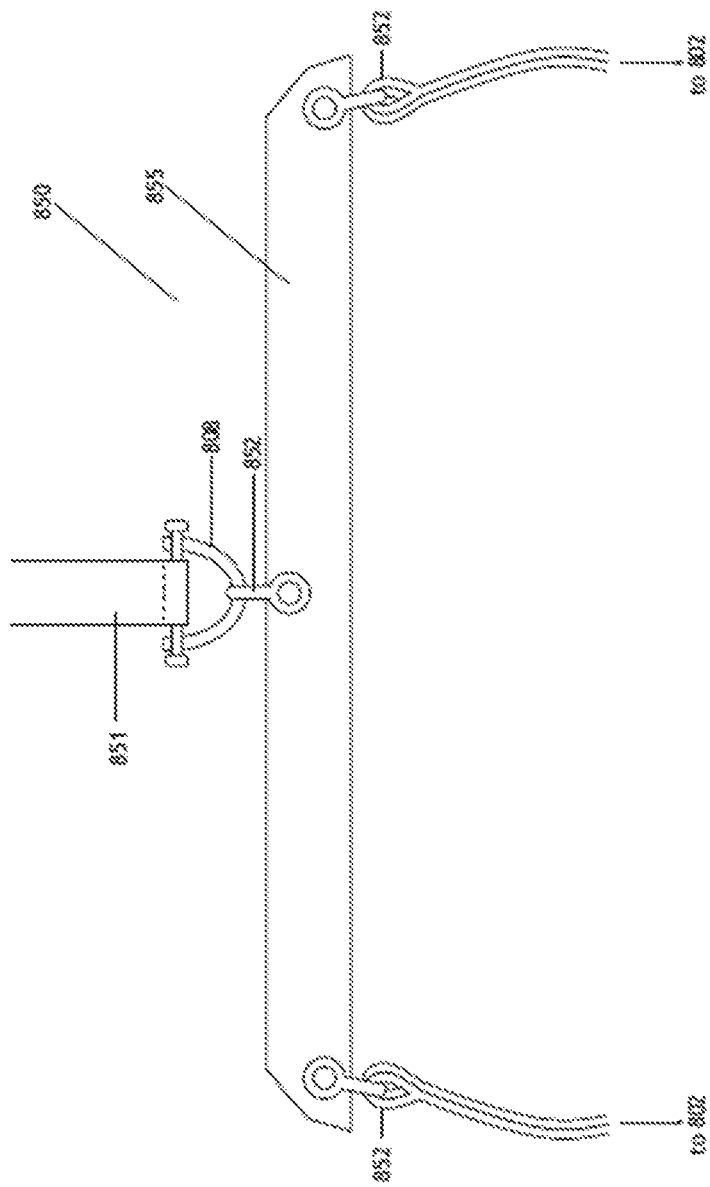
FIG. 9 details a front-loading strap apparatus as a separate loading strap iteration where aircraft specifications make it preferable to pull from front skid struts vs. rear skid struts.

The straps are actually made up of five strap sub-sections that are depicted in FIGS. 8B and 8C for two rear-loading configurations and FIG. 9 for newer front load configuration. The entire strap assembly 800 comprises a center, left and right strap sections 801. The center section connects to the winch. The left and right sections of 801 end with a quick release assembly 802 that is wrapped around the helicopter skid. Again, as helicopter skids vary, so does size of various strap 800 components. Front loading strap 850 comprises main center strap 851, shackle 808, connecting shackles 852, front-load bar 855, and side straps 801 which will of course be shorter as they lead to quick release assembly 802. The quick release assembly (FIGS. 8b and 8C) comprises a quick release loop 803, length of which will vary with helicopter skid diameter, T-handle quick release pin 804 which includes lanyard, quick release buckle 805, pin 806 and pin 807. Referring to FIG. 8A, when the strap is not in use and the trailer is parked, and strap holder 810 can be used to secure strap when travelling empty. A ramp 811 prevents catching on frame when reeling in the strap.

In operation the trailer 40 (FIG. 11) is backed up such that the vertical rollers 215 are on either side of the helicopter skids and the trailer 20 is generally aligned with the helicopter. The strap 800 (see FIGS. 8B, 8C, and 9 for differing variations) is released from the winch 221 and can be attached to the helicopter. Latch cylinder 213 can be powered to release the latches 212. Cylinder 208 can then be powered to move the pivot link 211 from the transport position shown in FIG. 12 to the loading position. The pivot link 211 is then free to move. The trailer is preferably then backed up further and rocker rollers are engaged as aircraft gently self-loads until the rocker roller assembly 216 pivots down and is resting level with the main rollers 219. This is a preferred load sequence over dragging helicopter with winch, but is not necessary to accomplish the load. Strap is attached to left and right skids at either the front or rear skid strut depending on the dimensional data, center of gravity, or reinforced attachment points of the aircraft. Power from batteries 220C can then be applied to power a hydraulic pump 206 and winch control 202A can be activated to power winch 221 and wind the strap 800 and pull the helicopter the remaining distance onto bed of horizontal rollers 219. The tops of horizontal rollers 219 form a horizontal platform surface. As the winch 221 tightens the strap, the helicopter will move toward front of the trailer. The operator loading the helicopter can stand at a safe distance and stop the winch when aircraft hits bumpers 107A or may use 207 bumpers for an automatic stop when the helicopter is fully loaded. Vertical rollers 215 on corners help to guide the helicopter skids onto the trailer 40. The winch 221 pulls the helicopter forward toward the front of the trailer 40 until the skids contact bumpers 207. Strap alignment guide 221C keeps strap centered and assists in centering load onto trailer 40. Ground rollers 217 keep the trailer platform from hitting the ground during the load sequence, protecting the roller platform and rocker rollers. Rocker rollers 216 have their travel range limited such that on a typical load they will never rotate fully to ground, therefore allowing ground rollers 217 to absorb forces as trailer moves in the load or unload sequence.

Cylinder 208 reverses direction moving the pivot link 211 back to pivot the axle pivots 222A and 222B to raise the trailer deck platform 218 and helicopter from the load position back to the transport position. When the platform 218 is fully raised the link 211 can be locked against motion by cylinder 213 and secured by lock latch 212. The helicopter is then secured to the trailer 40 via tie-down links 907 (FIG. 8D) which are welded onto the frame in this embodiment.

The remote control 202A is housed inside a central control panel 202 (FIG. 18). Switches on the control panel 202 can control operation of the winch 221 and cylinders. Most customers prefer the remote controller 202A to operate the winch 221. If customer desires the control can be hardwired into the panel itself rather than using the remote control 202A.

As shown the winch 221 in this embodiment is electrically controlled from batteries 220C while the lock cylinders 213 and lift cylinders 208 are powered by hydraulic fluid from pump 206 which in turn is powered by batteries 220C. It will be understood that the cylinders and/or winch could be electrically or hydraulically powered.

Throughout this application, various Patents and Applications are referenced by number and inventor. The disclosures of these Patents/Applications in their entireties are hereby incorporated by reference into this specification in order to more fully describe the state of the art to which this invention pertains.

Although the description above contains many specificities, these should not be construed as limiting the scope of the invention but as merely providing illustrations of some of the presently preferred embodiments of this invention.

It is evident that many alternatives, modifications, and variations may be made to the embodiments described above without departing from the scope of the present invention. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

We claim:

1. An aircraft transport trailer for loading, transporting, and unloading a helicopter, said aircraft transport trailer comprising:
   a trailer having a plurality of wheels;
   a power unit mounted on said trailer;
   a height adjustable roller platform having a first position for loading or unloading said helicopter and a second position for transporting said helicopter;
   a winch for moving said helicopter, said winch being power driven, said winch mounted upon said trailer, said winch for pulling said helicopter forward;
   a strap assembly, a first end of said strap assembly in cooperative engagement with said winch, a second end of said strap assembly engageable with said helicopter; and
   at least one switch disposed upon said trailer in cooperative engagement with said winch, said at least one switch being positioned upon said trailer proximate to a towing position for said helicopter, said at least one switch cutting said power to said winch as said helicopter skid or wheel touch said at least one switch thereby positioning said helicopter upon said platform such that when said trailer is raised to said second position the helicopter is properly located for transporting.

2. The aircraft transport trailer of claim 1, wherein said power source is electric, hydraulic, pneumatic, or battery.

3. The aircraft transport trailer of claim 1, wherein said winch is operable by a remote control.

4. The aircraft transport trailer of claim 1, wherein said at least one switch is a pair of switches, one mounted to engage a skid or wheel along each side of said trailer.

5. The aircraft transport trailer of claim 1, wherein the position of said plurality of switches are also adjustable front to rear to accommodate a varying center of gravity or a varying sized helicopter.

6. The aircraft transport trailer of claim 1, wherein said winch is operable from a control switch on a central control panel.

7. The aircraft transport trailer of claim 1, wherein said at least one switch is a micro switch.

8. The aircraft transport trailer of claim 1, wherein said at least one switch is mounted in a bumper, said bumper including a cushioned material.

9. An aircraft transport trailer for loading, transporting, and unloading a helicopter, said aircraft transport trailer comprising:
   a trailer having a plurality of wheels;
   a power unit mounted on said trailer;
   a height adjustable roller platform having a first position for loading or unloading said helicopter and a second position for transporting said helicopter;
   a winch for moving said helicopter, said winch being power driven, said winch mounted upon said trailer, said winch for pulling said helicopter forward; and
   a strap assembly, a first end of said strap assembly in cooperative engagement with said winch, a second end of said strap assembly engageable with said helicopter.

10. The aircraft transport trailer of claim 9, wherein said power source is electric, hydraulic, pneumatic, or battery.

11. The aircraft transport trailer of claim 9, further comprising an adjustment in said forward and rearward directions for a variable center of gravity of said helicopter, said variable center of gravity resulting from fuel level within said helicopter.

12. The aircraft transport trailer of claim 9, wherein said winch is operable by a remote control.

13. The aircraft transport trailer of claim 9, wherein said winch is operable from a control switch on a central control panel.

14. The aircraft transport trailer of claim 9, further comprising a member, said member engaging with said second end of said strap assembly, said member for attachment engaging with a portion of said helicopter.

15. An aircraft transport trailer for loading, transporting, and unloading a helicopter, said aircraft transport trailer comprising:
- a trailer having a plurality of wheels;
- a power unit mounted on said trailer;
- a height adjustable roller platform having a first position for loading or unloading said helicopter and a second position for transporting said helicopter;
- a winch for moving said helicopter, said winch being power driven, said winch mounted upon said trailer, said winch for pulling said helicopter forward; and
- at least one switch disposed upon said trailer in cooperative engagement with said winch, said at least one switch being positioned upon said trailer proximate to a towing position for said helicopter on said aircraft, said at least one switch cutting said power to said winch as said helicopter skid or wheel touch said at least one switch thereby positioning said helicopter upon said platform such that when said trailer is raised to said second position the aircraft is properly located for transporting.

16. The aircraft transport trailer of claim 15, wherein said at least one switch is a pair of switches, one mounted to engage a skid or wheel along each side of said trailer.

17. The aircraft transport trailer of claim 15, wherein the position of said plurality of switches are also adjustable front to rear to accommodate a varying center of gravity or a varying sized helicopter.

18. The aircraft transport trailer of claim 15, wherein said winch is operable by a remote control.

19. The aircraft transport trailer of claim 15, wherein said winch is operable from a control switch on a central control panel.

20. The aircraft transport trailer of claim 15, wherein said at least one switch is mounted in a bumper, said bumper including a cushioned material.

* * * * *